(12) United States Patent
Berkeley

(10) Patent No.: US 7,414,412 B2
(45) Date of Patent: Aug. 19, 2008

(54) MOWER PRESENCE CONTROL ASSEMBLY INCLUDING A RIBBON SWITCH

(75) Inventor: James E. Berkeley, Pineville, NC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/752,653

(22) Filed: May 23, 2007

(65) Prior Publication Data

US 2007/0214761 A1 Sep. 20, 2007

Related U.S. Application Data

(62) Division of application No. 10/872,189, filed on Jun. 18, 2004, now Pat. No. 7,228,679.

(51) Int. Cl.
*G01N 27/00* (2006.01)

(52) U.S. Cl. .................................................... 324/658

(58) Field of Classification Search ............. 56/10.2 R, 56/10.5; 324/686, 661, 660, 658; 200/600, 200/86 R; 340/665
See application file for complete search history.

(56) References Cited

U.S. PATENT DOCUMENTS

| | | | |
|---|---|---|---|
| 2,924,055 A | 2/1960 | Clemson | |
| 3,710,054 A | 1/1973 | Koenig | |
| 3,715,541 A | 2/1973 | Koenig | |
| 3,717,735 A | 2/1973 | Koenig | |
| 3,751,615 A | 8/1973 | De Loisy et al. | |
| 4,003,190 A | 1/1977 | Braun et al. | |
| 4,080,519 A | 3/1978 | Michalson | |
| 4,145,864 A | 3/1979 | Brewster, Jr. | |
| 4,270,032 A | 5/1981 | Dobberpuhl | |
| 4,293,752 A | 10/1981 | Koenig | |
| 4,684,767 A | 8/1987 | Phalen | |
| 4,742,192 A | 5/1988 | Levine et al. | |
| 4,794,215 A | 12/1988 | Sawada et al. | |
| 4,861,034 A * | 8/1989 | Lee ........................... | 473/202 |
| 4,946,262 A | 8/1990 | Diemeer et al. | |
| 5,397,890 A | 3/1995 | Schueler et al. | |
| 5,646,461 A | 7/1997 | Kubota et al. | |
| 5,708,244 A | 1/1998 | Conti | |

(Continued)

FOREIGN PATENT DOCUMENTS

EP 0177267 4/1986

(Continued)

OTHER PUBLICATIONS

Controflex Ribbon Switches, pp. 3-7, Tapeswitch Corporation, no date.

*Primary Examiner*—Árpád Fábián-Kovács
(74) *Attorney, Agent, or Firm*—Harness, Dickey & Pierce, P.L.C.

(57) ABSTRACT

An operator presence control assembly for a walk-behind greens mower includes a handle supported on a frame of the walk-behind greens mower, a ribbon switch on the outer perimeter of the handle, and a circuit including the ribbon switch. The circuit is completed by applying a threshold pressure to the ribbon switch, and a device selectively energizeable via the circuit in accordance with the threshold pressure applied to the ribbon switch. As the user of the greens mower grips the handle, the ribbon switch completes a circuit to energize a switch to engage an electromagnetic clutch.

22 Claims, 4 Drawing Sheets

U.S. PATENT DOCUMENTS

| | | |
|---|---|---|
| 6,170,241 B1 | 1/2001 | Shibilski et al. |
| 6,262,712 B1 * | 7/2001 | Osborne et al. ............. 345/156 |
| 6,308,792 B1 | 10/2001 | Garrett |
| 6,501,281 B1 | 12/2002 | Rundo |
| 7,034,552 B2 | 4/2006 | Kirchner et al. |
| 2005/0023067 A1 * | 2/2005 | Ledford et al. ............. 180/315 |
| 2005/0179448 A1 * | 8/2005 | Kirchner et al. ............. 324/686 |

FOREIGN PATENT DOCUMENTS

| | | |
|---|---|---|
| JP | 2000-228126 A | 8/2000 |
| WO | 96/18067 | 6/1996 |
| WO | 99/63560 | 12/1999 |
| WO | 03019594 | 3/2003 |

\* cited by examiner

US 7,414,412 B2

MOWER PRESENCE CONTROL ASSEMBLY INCLUDING A RIBBON SWITCH

CROSS-REFERENCE TO RELATED APPLICATIONS

This application is a divisional of U.S. patent application Ser. No. 10/872,189, filed on Jun. 18, 2004. The disclosure of the above application is incorporated herein by reference.

FIELD OF THE INVENTION

The present invention relates to a walk-behind greens mower and, more particularly, to an operator presence control system for a walk-behind greens mower.

BACKGROUND OF THE INVENTION

Operator presence features are common in walk-behind reel mowers and rotary mowers. Typically, the mower is provided with a lever, also known as a bale, which can be moved between an engaged and disengaged position. The bale engages cable links, springs, and other mechanical components in order to enable a micro-switch and activate the cutting mechanism. However, it should be understood that these systems require additional mechanical components that increase the cost of the mower and further increase the complexity of operation of the operator presence control system.

Therefore, while the existing operator presence control mechanisms may operate sufficiently, it is desirable to provide a walk-behind reel mower with an operator presence control having a reduced number of components, simplified operation, and improved reliability.

SUMMARY OF THE INVENTION

The present invention relates to an operator presence control assembly for a walk-behind greens mower. The operator pressure control assembly includes a handle supported on a frame of the walk-behind greens mower and a ribbon switch mounted on the outer perimeter of the handle. An electrical circuit, including the ribbon switch, is energized in response to application of a threshold pressure to the ribbon switch, which causes a device to be selectively energized.

The present invention further relates to a walk-behind greens mower having a frame, a power source coupled to the frame, a traction roller coupled to the frame and drivingly connected to the power source, and a reel rotatably mounted to the frame and selectively driven by the power source. An electromagnetic clutch is further provided for transferring power from the power source to the traction roller and the reel, whereby the electromagnetic clutch is interposed between the power source and a transmission. An electric circuit is electrically connected between the power source and the electromagnetic clutch. The electric circuit includes a rectifier connected to the power source, a ribbon switch connected to the rectifier, and an electromagnet interposed between the ribbon switch and the electromagnetic clutch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
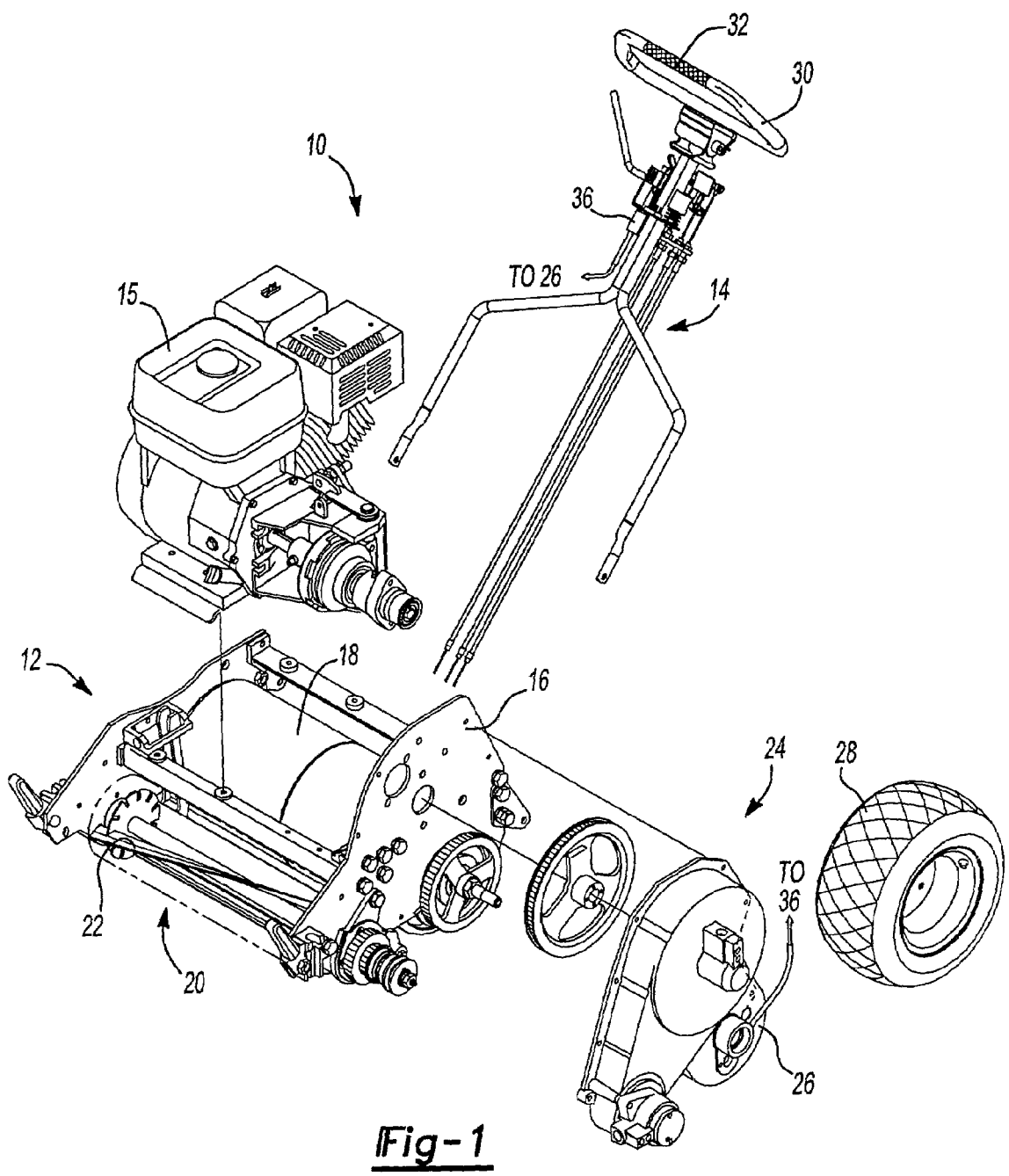
FIG. 1 illustrates an exploded view of a greens mower constructed in accordance with the teachings of the present invention.

Referring to FIG. 1, a walk-behind greens mower constructed in accordance with the teachings of the present invention is depicted at reference number 10. While the operator control assembly of the present invention is shown in conjunction with a walk-behind greens mower powered by an internal combustion engine, other devices may incorporate the same operator control assembly. Furthermore, these devices may utilize electric motors, hybrid power sources, or the like. For example, any walk-behind device such as a blower, string trimmer, or mower may incorporate the operator control assembly of the present invention. Additionally, the invention described herein will be illustrated in the context of an articulating handle. One skilled in the art will recognize that the subject of the present invention will be equally applicable to various articulating and non-articulating configurations.

Mower 10 includes a cutting unit 12 and an operator control assembly 14. Typically, cutting unit 12 includes a power source or engine 15 coupled to a frame 16. Traction roller 18 is rotatably coupled to frame 16 and drivingly connected to engine 15. Reel 20 includes blades 22 rotatably mounted to frame 16 and is selectively driven by engine 15. A transmission 24 is also included on the frame 16. Between transmission 24 and engine 15 is an electromagnetic clutch 26. Electromagnetic clutch 26 is responsible for selectively transferring power from engine 15 to traction roller 18 and reel 20. Wheels 28 are connected to traction roller 18 to provide motive force for translating mower 10 along the ground.

Electromagnetic clutch 26 is controlled by means of operator presence control assembly 14. Operator presence control assembly 14 comprises a handle 30 with a ribbon switch 32. Ribbon switch 32 electrically connects with a micro-switch 36. Micro-switch 36 connects to electromagnetic clutch 26 to enable engine 15 to engage transmission 24.

Figure 2:
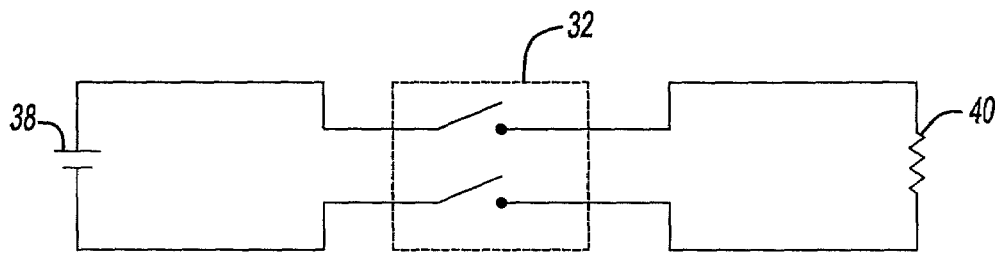
FIG. 2 is a circuit diagram of a ribbon switch used in accordance with the teachings of the present invention.

Referring now to FIG. 2, this figure shows a basic circuit diagram demonstrating the electrical significance of ribbon switch 32. A voltage source 38 is connected to one end of ribbon switch 32, while an electrical load 40 is connected to a second end of ribbon switch 32. As the minimum threshold pressure is applied to ribbon switch 32, the circuit is complete and current can flow from voltage source 38 to electrical load 40. When the pressure applied to ribbon switch 32 falls below the threshold pressure, the circuit opens and current can not flow from voltage source 38 to electrical load 40. In one configuration of the present invention, voltage source 38 is replaced by engine 15 or a battery, and electrical load 40 is replaced by micro-switch 36.

Figure 3:
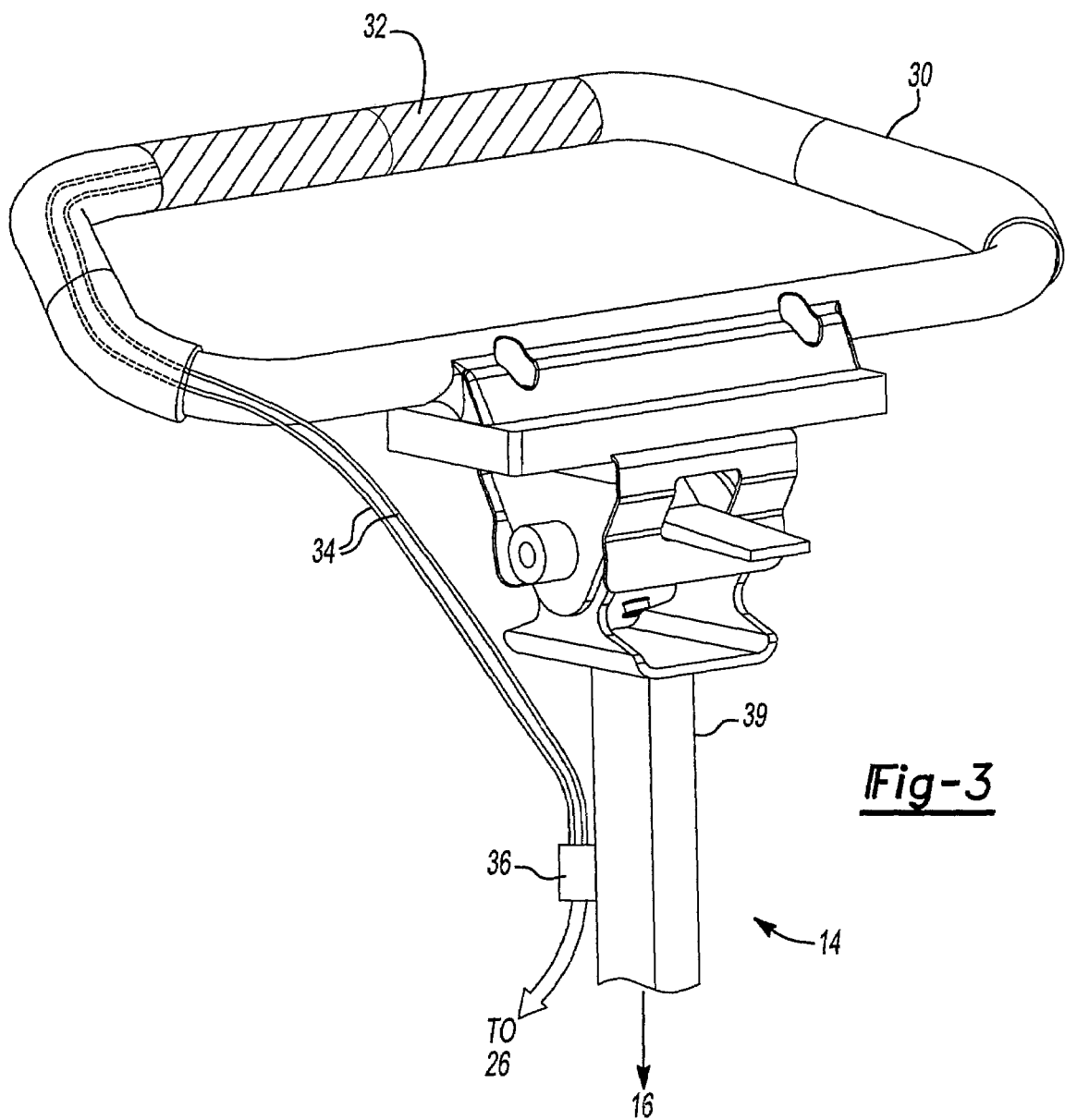
FIG. 3 is a perspective view of one embodiment of the operator control assembly constructed in accordance with the teachings of the present invention.

FIG. 3 illustrates operator control assembly 14 in greater detail. As previously stated, operator control assembly 14 consists of handle 30, ribbon switch 32, and micro-switch 36. Handle 30 connects to a support arm 39, which is coupled to frame 16. Ribbon switch 32 is attached to handle 30 and is electrically connected to micro-switch 36 through leads 34. Micro-switch 36 is further electrically connected to electromagnetic clutch 26. When energized, electromagnetic clutch 26 causes engine 15 to engage transmission 24.

In order for ribbon switch 32 to complete a circuit, the mower operator must apply the minimum threshold pressure as previously stated. Once the operator applies the minimum threshold pressure, ribbon switch 32 conducts current. The minimum threshold pressure required for ribbon switch 32 to conduct electricity preferably is selected so that the operator can apply such pressure by comfortably gripping handle 30 on which ribbon switch 32 is attached. When the mower operator releases handle 30, ribbon switch 32 opens and stops conducting current. This action disables micro-switch 36, which de-energizes electromagnetic clutch 26.

Figure 4:
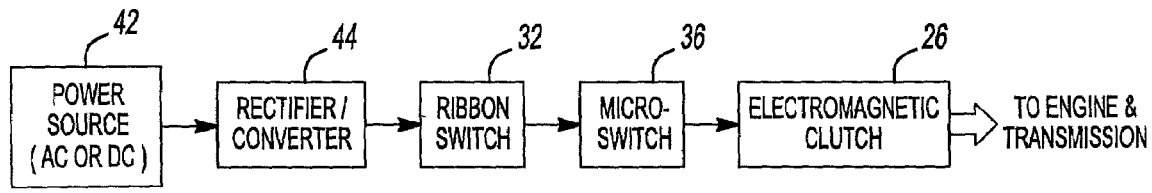
FIG. 4 is a block diagram of an operator presence control system in accordance with the teachings of the present invention.

FIG. 4 is a block diagram of a control system 40 typically associated with the operator control assembly of the present invention. Control system 40 includes a power source 42. Power source 42 can be either alternating current (AC) or direct current (DC) supplied by a device driver by engine 15 or a battery. Depending on the type of device, power source 42 delivers either an AC or DC signal to a rectifier or converter 44. If the signal is AC, rectifier 44 converts the AC signal to a DC signal. If the power source is DC, converter 44 adjusts the DC level to that required by micro-switch 36. Ribbon switch 32 is interposed between rectifier or converter 44 and micro-switch 36. When ribbon switch 32 senses pressure sufficient to complete the circuit, the DC signal is transmitted to micro-switch 36. When ribbon switch 32 does not sense sufficient pressure to complete the circuit, micro-switch 36 is de-energized. Micro-switch 36, when energized, engages electromagnetic clutch 26, such that, the power from engine 15 travels to transmission 24, allowing reel 20 to turn.

Figure 5A:
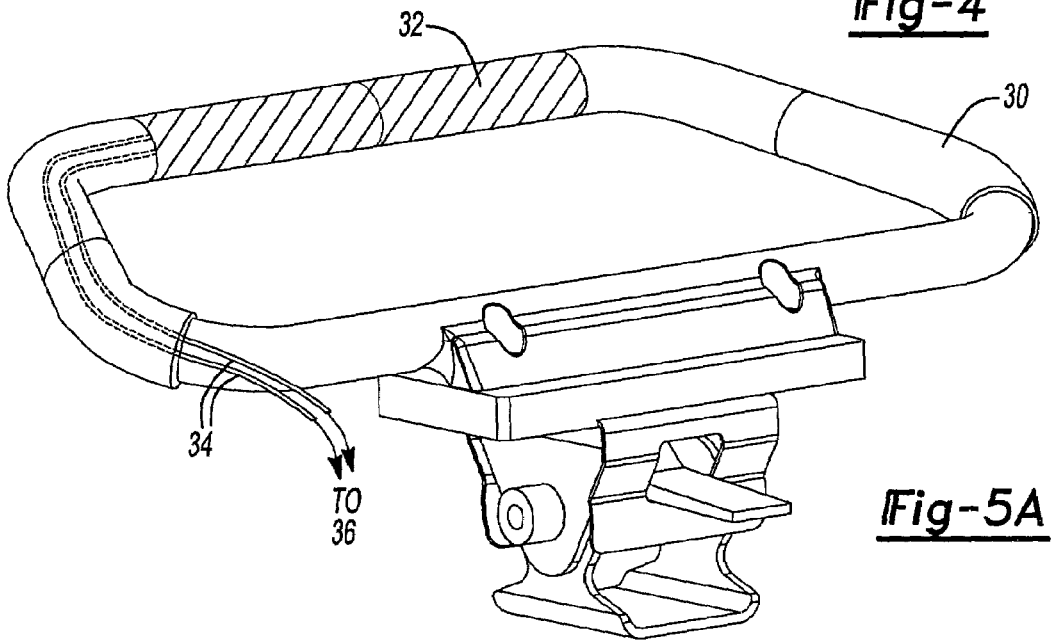
FIGS. 5a through 5d display different configurations of the ribbon switch and handle in accordance with the teachings of the present invention.
Figure 5B:
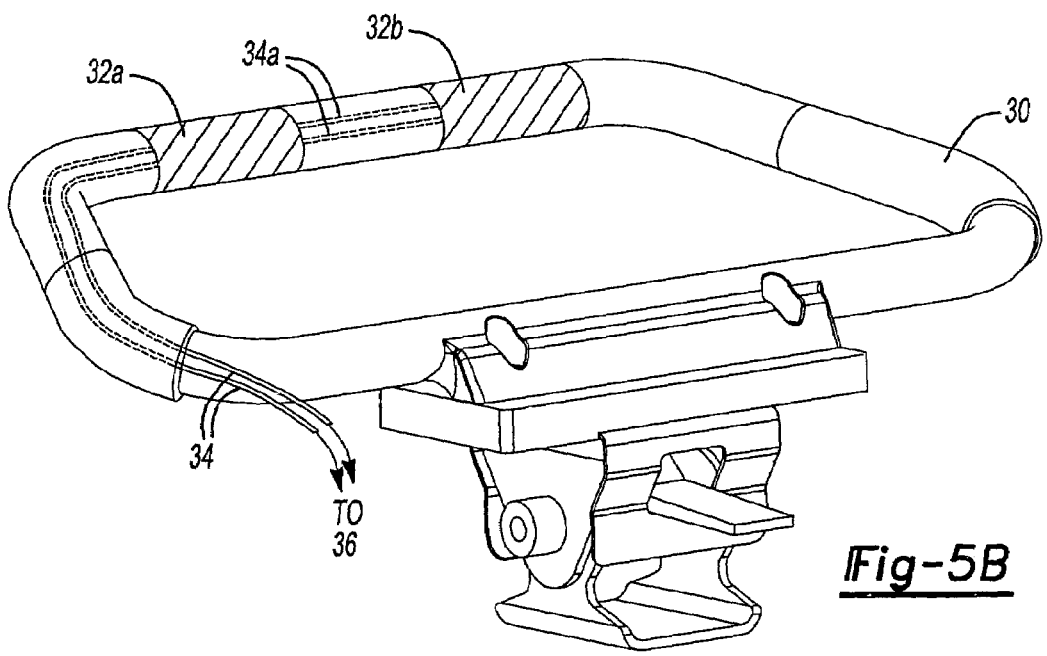
Figure 5C:
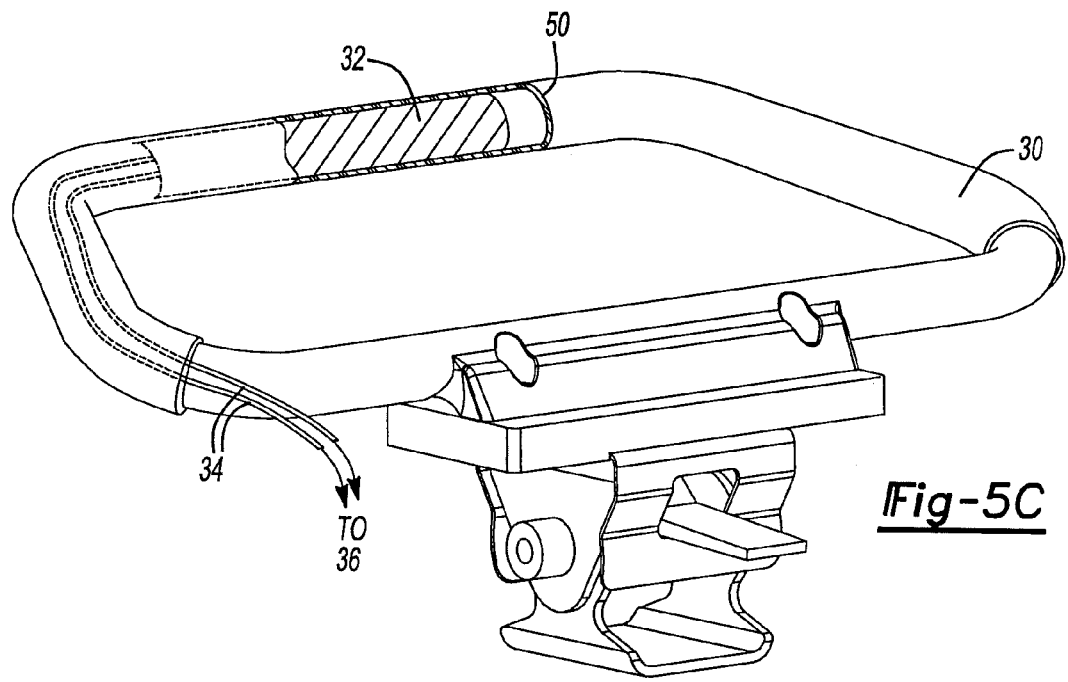

Referring now to FIGS. 5a through 5c, these figures illustrate various methods of attaching ribbon switch 32 to handle 30. These arrangements are merely exemplary in nature, and other similar variations that do not depart from the invention are intended to be within the scope of the invention. First, referring to FIG. 5a, ribbon switch 32 wraps around the outer perimeter of handle 30 and connects to micro-switch through leads 34. This arrangement allows the user to grip handle 30 with only one hand to complete the circuit and activate micro-switch 36.

Alternatively, FIG. 5b illustrates a two-handed configuration. In this arrangement, ribbon switch 32 is arranged around handle 30 in such a way that both of the operator's hands must be present on handle 30 in order for the circuit to be complete. Ribbon switch 32a is electrically connected in series with ribbon switch 32b through leads 34a, and connects to micro-switch 36 through leads 34. Both switches must be closed in order enable micro-switch 36. Therefore, if the mower operator takes one or both hands off of handle 30, micro-switch 36 will be disabled, de-energizing electromagnetic clutch 26. A parallel connection of ribbon switches 32a and 32b may enable the operator to use either hand to enable energization of microswitch 36.

Figure 5D:
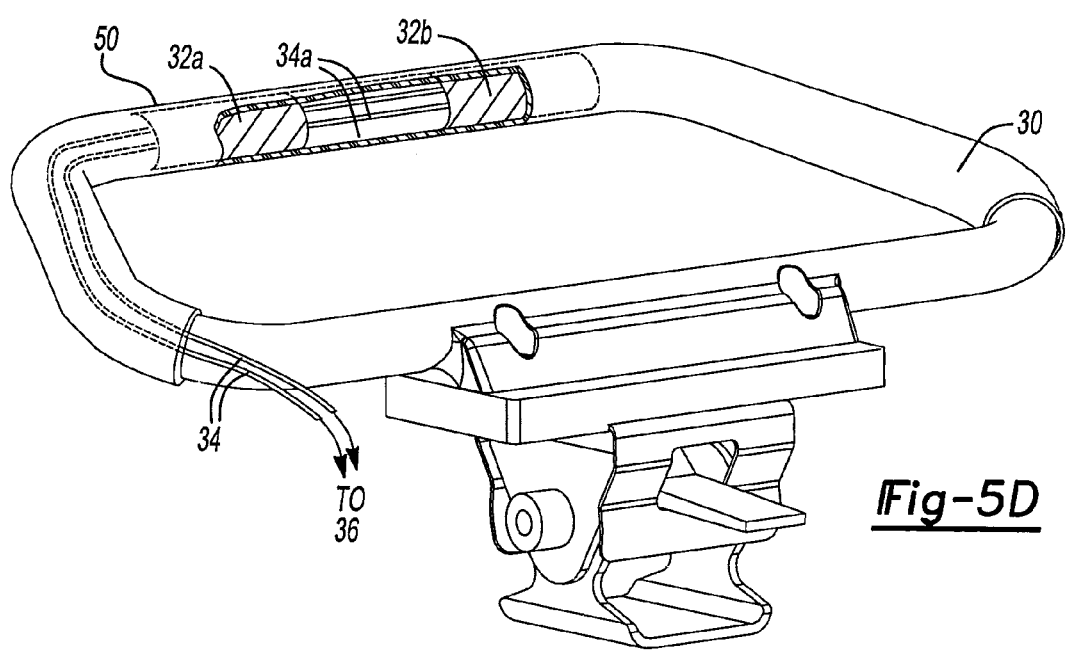

Next, FIG. 5c shows ribbon switch 32 embedded in handle 30. Embedding ribbon switch 32 into handle 30 makes the existence of ribbon switch 32 unknown to the user. One method of embedding ribbon switch 32 onto handle 30 is to place an elastomer 50 over the combination of ribbon switch 32 and handle 30. Coating ribbon switch 32 and handle 30 with elastomer 50 makes the presence of ribbon switch 32 unknown to the mower operator. FIG. 5c shows elastomer 50 only covering half of ribbon switch 32, however, ideally, elastomer 50 would cover ribbon switch 32 completely. Furthermore, although FIG. 5c shows a one-handed configuration, ribbon switch 32 could be embedded in handle 30 such that two hands are required to complete the circuit, as demonstrated in FIG. 5d. In FIG. 5d, ribbon switch 32a and 32b are completely covered by elastomer 50.

Ribbon switch 32 attaches to handle 30 through any number of ways. For example, ribbon switch 32 may simply wrap around handle 30 forming a new layer on the outer perimeter. Alternatively, ribbon switch 32 could have an adhesive side that would stick to handle 30 by simply placing a strip across the handle. With this method, ribbon switch 32 could be placed on the top or bottom side of handle 30. Either of these methods allow ribbon switch 32 and handle 30 to be coated with elastomer 50 to render ribbon switch 32 invisible to the mower operator.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An operator presence control assembly for a walk-behind greens mower comprising:
    a handle supported on a frame of the walk-behind greens mower;
    a ribbon switch oriented about an outer perimeter of the handle operable by a pressure applied by an operator and positioned only in either of an open position when no pressure is applied or a closed position when a threshold pressure is reached;
    a circuit including the ribbon switch, the circuit being completed when the threshold pressure is applied to the ribbon switch; and
    a device selectively energizeable via the circuit in accordance with the threshold pressure applied to the ribbon switch.

2. The operator presence control assembly of claim 1 further comprising a power source supplying electrical power to the circuit.

3. The walk-behind greens mower of claim 2 wherein the electrical power delivered by the power source to the circuit is a direct current.

4. The walk-behind greens mower of claim 2 wherein the electrical power delivered by the power source to the circuit is an alternating current.

5. The operator presence control assembly of claim 4 further comprising a rectifier, the rectifier converting the alternating current to the direct current.

6. The operator presence control assembly of claim 4 further comprising a converter, the converter converting a first direct current to a second direct current for application to a micro-switch.

7. The operator presence control assembly of claim 1, further comprising:

the handle including a substantially circular tube defining a top side and a bottom side of the tube;

wherein the ribbon switch is embedded in the handle and positioned as a strip at one of the top and bottom sides.

8. The operator presence control assembly of claim 7 whereby the handle and the ribbon switch are coated with an elastomer.

9. The operator presence control assembly of claim 1 wherein the power source is an internal combustion engine generating electrical power.

10. The operator presence control assembly of claim 1 wherein the power source comprises a first battery.

11. The operator presence control assembly of claim 10 wherein the power source comprises a second battery.

12. An operator presence control assembly for a walk-behind greens mower comprising:

a handle supported on a frame of the walk-behind greens mower;

a pressure activated first ribbon switch on an outer perimeter of the handle operable only in either of an open or a closed position, closed when a threshold pressure is sensed;

a pressure activated second ribbon switch on the outer perimeter of the handle operable only in either of an open or a closed position, the second ribbon switch electrically connecting in series to the first ribbon switch, and closed when the threshold pressure is sensed;

a circuit including the first and second ribbon switch, the circuit being completed by applying a threshold pressure to the first and second ribbon switch; and a device selectively energizeable via the circuit when the threshold pressure is sensed by both the first and second ribbon switches.

13. The operator presence control assembly of claim 12 further comprising a power source supplying electrical power to the circuit.

14. The walk-behind greens mower of claim 13 wherein the electrical power delivered by the power source to the circuit is a direct current.

15. The walk-behind greens mower of claim 13 wherein the electrical power delivered by the power source to the circuit is an alternating current.

16. The operator presence control assembly of claim 15 further comprising a rectifier, the rectifier converting the alternating current to the direct current.

17. The operator presence control assembly of claim 15 further comprising a converter, the converter converting a first direct current to a second direct current for application to a micro-switch.

18. The operator presence control assembly of claim 12 wherein the ribbon switches are embedded in the handle.

19. The operator presence control assembly of claim 18 whereby the handle and the ribbon switches are coated with an elastomer.

20. The operator presence control assembly of claim 12 wherein the power source is an internal combustion engine generating electrical power.

21. The operator presence control assembly of claim 12 wherein the power source comprises a first battery.

22. The operator presence control assembly of claim 21 wherein the power source comprises a second battery.

* * * * *